(12) United States Patent
Lee

(10) Patent No.: US 6,372,828 B2
(45) Date of Patent: *Apr. 16, 2002

(54) HIGH TEMPERATURE FLAME RETARDANT INSULATION COMPOSITIONS STABILIZED WITH ZINC SALT/SECONDARY AMINE COMBINATIONS

(75) Inventor: Lester Y. Lee, Hamilton, OH (US)

(73) Assignee: Equistar Chemicals, LP, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,514

(22) Filed: Nov. 8, 1999

(51) Int. Cl.[7] .................. C08L 24/08; C09K 5/14; C09K 5/18; C09K 5/34; C09K 5/3417
(52) U.S. Cl. .................. 524/93; 524/94; 524/258; 524/265; 524/266; 524/411; 524/412; 524/436; 524/562; 525/281; 525/305; 525/387
(58) Field of Search .................. 524/93, 94, 225, 524/229, 255, 258, 411, 412, 436, 562, 265, 266; 525/281, 305, 330.5, 330.3, 387

(56) References Cited

U.S. PATENT DOCUMENTS

| | | | |
|---|---|---|---|
| 2,997,456 A | 8/1961 | Mills | |
| 3,218,276 A | 11/1965 | Ringwald et al. | |
| 3,832,326 A | 8/1974 | North et al. | |
| 3,922,442 A | 11/1975 | North et al. | |
| 4,248,763 A | 2/1981 | Yoshimura et al. | |
| 4,260,661 A | 4/1981 | Walters et al. | |
| 4,349,605 A | 9/1982 | Biggs et al. | |
| 4,351,790 A | 9/1982 | Hochstrasser et al. | |
| 4,381,362 A | 4/1983 | Biggs et al. | |
| 4,459,380 A | 7/1984 | Vostovich | |
| 4,693,937 A | * 9/1987 | Wu et al. | 428/389 |
| 4,797,323 A | 1/1989 | Wu et al. | |
| 4,808,643 A | 2/1989 | Lemoine et al. | |
| 4,824,883 A | 4/1989 | Walters et al. | |
| 5,191,004 A | * 3/1993 | Maringer et al. | 524/265 |
| 5,196,462 A | 3/1993 | Berta | |

FOREIGN PATENT DOCUMENTS

| | | | | |
|---|---|---|---|---|
| GB | 2185262 | * | 7/1987 | C08L/23/02 |
| JP | 57 67640 | * | 4/1982 | C08L/23/00 |
| JP | 57-067640 A | | 4/1982 | |
| JP | 58-008738 A | | 1/1983 | |
| JP | 58-183740 A | | 10/1983 | |

OTHER PUBLICATIONS

Osawa, Z.: "Role of Metals and Metal–Deactivators in Polymer Degradation," *Polymer Degradation and Stability:* 20 (1988) pp. 203–236.

* cited by examiner

*Primary Examiner*—David W. Wu
*Assistant Examiner*—Kelechi Egwim
(74) *Attorney, Agent, or Firm*—Gerald A. Baracka; William A. Heidrich

(57) ABSTRACT

Flame retardant compositions useful as insulation for 150° C.-rated wire and cable applications are provided. The compositions of the invention utilize an ethylene-alkyl acrylate copolymer base resin with a two-component stabilizer package consisting of a zinc salt of a mercaptobenzimidazole and an aromatic secondary amine compound. Also, included to achieve the requisite flame retardance, crosslinkability and physical properties are a brominated flame retardant, antimony trioxide, a hydrated inorganic filler and a chemical crosslinking agent.

5 Claims, No Drawings

HIGH TEMPERATURE FLAME RETARDANT INSULATION COMPOSITIONS STABILIZED WITH ZINC SALT/SECONDARY AMINE COMBINATIONS

BACKGROUND OF THE INVENTION

1. Field of the Invention

This invention relates to improved crosslinked polymeric compositions used as insulation for wire and cable products. More particularly, the invention relates to flame-retardant ethylene-alkyl acrylate copolymer formulations used as wire and cable insulation for applications where high service temperatures are required.

2. Description of the Prior Art

Fire resistant polyolefin compositions are widely used for wire and cable insulation. In electrical environments both insulating and fire resistant properties are considered to be essential. Additionally, the compositions must be readily processable and should not deteriorate under the service conditions.

A widely used fire retarding insulation for wire and cable is comprised of a crosslinkable polymer, such as polyethylene or ethylene-vinyl acetate copolymer, one or more stabilizers or antioxidants, one or more hydrated inorganic fillers, and a crosslinking agent. Other additives such as pigments, processing oils, lubricants and coupling agents can also be included in these formulations. Compositions of this type which find use as single layer insulation and jacketing for copper wire are disclosed in U.S. Pat. Nos. 3,832,326 and 3,922,442 to North et al., and U.S. Pat. Nos. 4,349,605 and 4,381,362 to Biggs, et al.

For applications involving high service temperatures, such as 150° C. rated wires for use in ovens, water heaters, dryers, toasters, cookers and "under-the-hood" automobile uses, numerous compositions based on crosslinked polyethylene were developed capable of meeting the tensile strength and percent elongation retention requirements under the initial test criteria which specified aging at 158° C. for 90 days. However, as test conditions became more stringent in recent years, extending the aging period to 150 days in UL Standard 1581 (Style 3321), few of these original formulations were capable of meeting the more rigorous test conditions particularly when copper wire was being insulated. Copper has been reported to catalyze the auto-oxidation of polymers (see Z. Osawa, Polym. Deg. And Stab., 20, 203–236 (1988)) and, at the elevated temperatures encountered in severe service applications, it is believed copper I and II ions further accelerate the decomposition of polymer hydroperoxides to chain propagating radical species.

Accordingly, there is a need for effectively stabilized flame retardant insulation compositions which are readily processable yet capable of retaining tensile and elongation properties upon long term aging at elevated temperatures, particularly in the presence of copper.

The use of benzimidazoles to stabilize polyolefin compositions, particularly polyethylene and polypropylene, is known. U.S. Pat. No. 3,218,276 discloses the use of alkyl benzimidazole to stabilize fiber-forming polyolefins. Polypropylene fiber-forming compositions containing 0.2 to 2.0 percent benzimidazole with other conventional additives are disclosed. U.S. Pat. No. 2,997,456 teaches the use of metallic mercaptobenzimidazole compounds as stabilizers for polymers of 1-olefins, primarily polypropylene, to protect against molecular degradation under conditions of elevated temperature and/or mechanical working and zinc mercaptobenzimidazole is specifically mentioned.

The use of combinations of hindered phenols with various zinc salts of mercapto compounds to provide stabilization of cured and crosslinked polyolefins utilized as insulation for electrical conductors is disclosed in U.S. Pat. Nos. 4,260,661, 4,693,937, 4,797,323 and 4,824,883. For example, combinations of IRGANOX 1010 with the zinc salt of 2-mercaptobenzimidazole (ZMB), the zinc salt of 2-mercaptotolylimidazole (ZMTI) and the zinc salt of 2-mercaptobenzothiazole (ZMBT) are all illustrated. U.S. Pat. No. 4,459,380 discloses combining a sterically hindered phenol with a zinc salt of a mercaptoimidazole to stabilize crosslinkable curable ethylene-propylene rubber compositions. All of the references provide for the inclusion of other conventional additives, such as $Sb_2O_3$, halogenated compounds, fillers, silanes and crosslinking agents in the formulations. It is mentioned that ethylene copolymers, including ethylene-acrylate copolymers, can be stabilized using these zinc salt/hindered phenol combinations. U.S. Pat. No. 5,196,462 also shows the use of these combinations to stabilize thermoplastic elastomers and indicates that other antioxidants, such as phenols, thiodipropionates and quinolines may also be present.

Rubber/silicone compositions containing a metal benzimidazole, an aromatic secondary amine, an organopolysiloxane oil and organic peroxide are disclosed in U.S. Pat. No. 4,808,643.

SUMMARY OF THE INVENTION

It is an object of the present invention to provide improved crosslinkable, flame retardant polymeric compositions based on ethylene-alkyl acrylate copolymers which have good processing characteristics and are resistant to oxidative degradation. It is a further objective to provide compositions useful as insulation for wire and cable, particularly applications involving exposure to high service temperatures. The compositions of the invention meet UL Standard 1581 and, more specifically, UL Subject 758, Style 3321.

In accordance with this invention, the above objectives are realized utilizing an ethylene-alkyl acrylate base resin with a stabilizer consisting of a mixture of a zinc salt of a mercaptobenzimidazole and secondary aromatic amine compound at prescribed ratios, a brominated flame retardant, antimony trioxide, a hydrated inorganic filler and a chemical crosslinking agent. More specifically, the formulations comprise (1) 30 to 65 weight percent of a copolymer of ethylene and 3 to 40 weight percent alkyl acrylate having the formula

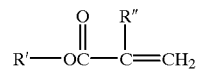

wherein R' is $C_{1-4}$ alkyl and R" is hydrogen or methyl having a melt index of 0.1 to 15 g/10 mins; (2) 1 to 10 weight percent of a stabilizer consisting of a mixture of a zinc salt of a mercaptobenzimidazole of the formula

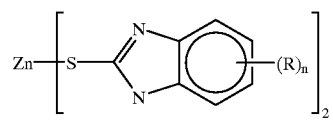

where R is a $C_{1-4}$ alkyl group and n is 0 to 4 with a secondary aromatic amine, the ratio of the zinc mercaptobenzimidazole compound to the secondary aromatic amine compound ranging from 0.2:1 to 20:1; (3) 5 to 40 weight percent brominated aromatic flame retardant compound; (4) 1.5 to 20 weight percent antimony trioxide; (5) 5 to 50 weight percent hydrated inorganic filler; and (6) 0.1 to 4 weight percent chemical crosslinking agent.

Ethylene-n-butyl acrylate copolymer formulations stabilized using a combination of ZMTI or ZMB with 4,4'-bis(α,α-dimethylbenzyl)diphenyl amine are highly useful for the invention. Compositions of the above type containing 42 to 52 weight percent base resin, 2.5 to 9 weight percent of the stabilizer combination, 10 to 15 weight percent brominated aromatic flame retardant, 3 to 6 weight percent antimony trioxide, 20 to 35 weight percent magnesium hydroxide and 1 to 2 weight percent tertiary organic peroxide are an even more preferred embodiment. Most preferred and highly useful for 150° C.-rated appliance wire applications are compositions wherein the copolymer base resin has a melt index of 0.3 to 10 g/10 min and contains 10 to 30 weight percent n-butyl acrylate; the brominated aromatic flame retardant is ethylene bistetrabromophthalimide; the hydrated inorganic filler is magnesium hydroxide; and the tertiary organic peroxide is selected from the group consisting of dicumyl peroxide and α,α'-bis(t-butylperoxide)diisopropylbenzene.

DETAILED DESCRIPTION

The present invention relates to wire and cable insulation compositions which exhibit significantly improved performance under high temperature service conditions. The compositions of the invention are comprised of the ethylene-alkyl acrylate base polymer, a stabilizer package consisting of a zinc salt of a mercaptobenzimidazole combined with an aromatic secondary amine compound, a brominated flame retardant compound, antimony trioxide, a hydrated inorganic filler and a chemical crosslinking agent. Optionally, other additives commonly used for the formation of insulation compounds such as processing aids, coupling agents and the like can also be included. The compositions of the invention are readily processable and crosslinkable using conventional techniques. When extruded onto a wire or cable and crosslinked they provide a tough, flame retardant insulation useful for high temperature service applications.

As employed herein, the terms "crosslink" and "cure" are used interchangeably and denote the formation of primary valence bonds between polymer molecules. Also, all parts, percentages and ratings referred to in the specification and claims which follow are on a weight basis unless otherwise indicated and weight percentages of the components of the formulation are based on the weight basis based on the weight of the total composition.

The ethylene-alkyl acrylate copolymer, also referred to herein as the base resin, used for the composition is a copolymer of ethylene and an alkyl acrylate of the formula

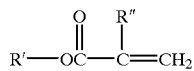

wherein R" is hydrogen or methyl and R' is a $C_{1-4}$ alkyl group. The alkyl acrylate comonomer will typically constitute from 3 to 40 weight percent and, more preferably, from 10 to 30 weight percent of the copolymer. Copolymers of this type are known and commercially available.

In one highly useful embodiment of the invention, the base resin is an ethylene-n-butyl acrylate (EnBA) copolymer obtained by copolymerizing ethylene and n-butyl acrylate (nBA). Formulations obtained using EnBA resins containing 15 to 25 weight percent nBA have been shown to have particularly desirable properties.

The ethylene-alkyl acrylate base resin will have a melt index ranging from 0.1 to 15 g/10 min and, more preferably, in the range 0.3 to 10 g/10 min. Melt index values are determined in accordance with ASTM D1238.

It is also possible to include minor proportions of other crosslinkable polymers or copolymers in the composition; however, the ethylene-alkyl acrylate copolymer should comprise at least 60 percent of the total polymers present. Representative of such minor polymeric components which can be used in such embodiments include polyethylene, polypropylene, ethylene-propylene copolymers and terpolymers. Low density polyethylene and linear low density polyethylene having melt indexes from 0.5 to 5 can be particularly beneficial.

A stabilizer consisting of a zinc salt of a mercaptobenzimidazole having the formula

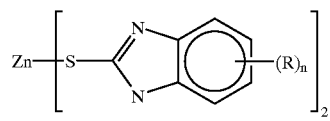

where R is a $C_{1-4}$ alkyl group and n is 0 to 4 and an aromatic secondary amine compound is employed with the ethylene-alkyl acrylate base resin. This combination affords superior stabilization at the high temperatures encountered in severe service applications where 150° C.-rated wire and cable insulations are required.

Mercaptobenzimidazoles where n is 0 or 1 and particularly those wherein R is methyl are especially useful for the invention. Zinc 2-mercaptobenzimidizole (ZMB) and zinc 2-mercaptotolylimidazole (ZMTI) are particularly advantageous and are available from commercial suppliers.

Aromatic secondary amine compounds which are employed with the mercaptobenzimidazole have the formula

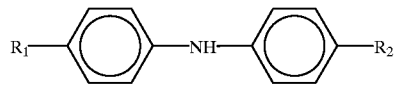

where $R_1$ is an aryl group of the formula

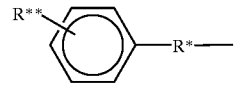

where R* is alkylene. alkylidene, —O—, —NH— or —SO$_2$— and R** is hydrogen or $C_{1-4}$ alkyl and $R_2$ is hydrogen, alkyl, aryl, alkaryl, aralkyl or $R_1$. Secondary aromatic amine compounds wherein R* is —CH$_2$—, —CH$_2$CH$_2$—, —C(CH$_3$)$_2$—, —NH— and —NH—SO$_2$— and R** is hydrogen or methyl are especially useful. Compounds within this latter group which are advantageously employed in view of their commercial availablility are 4,4'-bis(α,α-dimethylbenzyl)diphenyl amine (BDBDA) and N-phenyl-N'-(p-toluenesulfonyl)-p-phenylenediamine.

The weight ratio of the zinc mercaptobenzimidazole salt to aromatic secondary amine can range from 0.2:1 to 20:1 but, more preferably, will be from 0.5:1 to 10:1. In a particularly useful embodiment of the invention where the zinc mercaptobenzimidazole is ZMTI and the aromatic secondary amine is BDBDA, the ratio of ZMTI to BDBDA is 1:1 to 6:1.

A brominated aromatic flame retardant and antimony trioxide are included in the formulations in order to achieve the required flame retardancy for the compositions of the invention. Any of the commonly used brominated aromatic compounds can be used of which the following are representative: hexabromobenzene, pentabromoethylbenzene, tribromophenyl allyl ether, octabromodiphenyl, pentabromodiphenyl ether, octabromodiphenyl ether, decabromodiphenyl ether, tetrabromobisphenol A, bis (dibromopropyl)ether of tetrabromobisphenol A, tetrabromophthalic anhydride, ethylene bistetrabromophthalimide, hexabromocyclododecane and the like. Ethylene bistetrabromophthalimide has been found to be a particularly effective flame retardant for the ethylene-alkyl acrylate insulation compositions of the invention.

Antimony trioxide ($Sb_2O_3$) is included with the brominated aromatic compound $Sb_2O_3$ is known to function as a synergist with halogenated compounds and while it is possible to obtain useful formulations without a synergist, flame retardance is increased when $Sb_2O_3$ is included and it is possible to use lower levels of the brominated compound. This is advantageous from an economic standpoint and also from the standpoint of maximizing physical properties and processability. While antimony trioxide is the synergist of choice, other known synergists such as antimony pentoxide, antimony silicates, boron compounds, tin oxide, zinc oxide, zinc borate, aluminum trihydroxide may be used. In general, the weight ratio of brominated compound to synergist typically ranges from about 2:1 up to about 5:1 and, more preferably, from about 2.5:1 to 4:1.

A hydrated inorganic filler, such as hydrated aluminum oxides ($Al_2O_3 \cdot 3H_2O$ or $Al(OH)_3$), hydrated magnesia, hydrated calcium silicate, hydrated magnesium carbonates, or the like are also included in the formulations of the invention. It is known that these types of fillers can enhance physical properties and the water of hydration chemically bound to these inorganic fillers is released endothermically upon combustion or ignition of the base resin to assist in flame retardance. The filler size should be in accordance with those sizes used by the prior art. Magnesium hydroxide ($Mg(OH)_2$), also known as magnesium hydrate or hydrated magnesia, is most advantageously used in formulating the present compositions.

To achieve useful wire and cable insulation compositions having the necessary balance of physical properties and thermal and chemical resistance, it is necessary that the compositions be crosslinked. While crosslinking can be accomplished chemically or by using high energy radiation, it is more customary to use chemical crosslinking agents. Organic peroxides are the most commonly employed chemical crosslinking agents since they are capable of developing high levels of cure and uniform results. The organic peroxides are incorporated into the formulation at a temperature below their decomposition temperature and later activated to effect cure. Known crosslinking coagents, such as triallylcyanurate, trimethylolpropane trimethacrylate and the like, may be included with the organic peroxide to enhance cure.

Conventional organic peroxides known to the art which do not appreciably decompose at the temperatures employed during mixing/processing, typically 90° C. to 120° C., can be used for the invention. In an especially useful embodiment organic peroxides which undergo rapid decomposition in the range 130° C. to 205° C. are employed. Temperatures in this range are typically used in wire curing operations, such as when the coated wire is passed through a steam tube, a widely practiced procedure used in commercial operations.

Cure time is a function of temperature and the heat transfer properties of the insulation. Accordingly, cure times will vary depending on the thickness of the insulation, the size of the conductor and, when continuous steam vulcanization is used, the steam pressure.

Tertiary organic peroxides are particularly useful chemical crosslinking agents. Dicumyl peroxide and $\alpha,\alpha'$-bis(t-butylperoxy)diisopropylbenzene are especially advantageous tertiary organic peroxides. The above-describe ingredients may be combined and processed using conventional procedures. Typically mixing is accomplished using a high shear internal mixer such as a Banbury mixer, Farrel continuous mixer, Bolling Mixtrumat TM or Werner & Pfleiderer mixer at a temperature below which significant decomposition of the chemical crosslinking agent occurs. In addition to the previously mentioned mixers, other processing devices known to the art capable of intimately mixing the essential components may be used.

The formulations of the invention will typically contain 30 to 65 weight percent base resin, 1 to 10 weight percent of the stabilizer pacakage, 5 to 40 weight percent brominated aromatic flame retardant, 1.5 to 20 weight percent $Sb_2O_3$, 5 to 50 weight percent hydrated inorganic filler and 0.1 to 4 weight percent chemical crosslinking agent. More preferably, the base resin will comprise 42 to 52 weight percent of the total composition which will also include 2.5 to 9 weight percent stabilizer package, 10 to 15 weight percent brominated aromatic flame retardant, 3 to 6 weight percent $Sb_2O_3$, 20 to 35 weight percent hydrated inorganic filler and 1 to 2 weight percent organic peroxide.

The compositions may also contain other conventional additives such as carbon black, pigments, lubricants, processing aids, cure coagents and the like, provided they do not interfere with crosslinking or detract from the physical properties of the composition. Processing aids which can advantageously be employed include fatty acids or fatty acid derivatives, polymeric processing resins and hydrocarbon oils, or combinations thereof The fatty acid derivatives can include metal soaps, esters, ester-soaps, amides and the like. The total amount of any additional ingredients will generally not exceed about 10 weight percent and, most typically, will constitute less than 5 weight percent of the total composition.

Alkoxysilane additives may also be included in the formulation to facilitate binding the polymer and inorganic filler. Any conventional alkoxysilane known to the art can be used so long as it does not combust or degrade during polymer processing or interfere with crosslinking. Alkoxysilanes having 2 or 3 $C_{1-3}$ alkoxy substituents, e.g., methoxy, ethoxy, propoxy or combinations thereof, are particularly advantageous. Illustrative silanes include methyl triethoxysilane, methyltris (2-methoxyethoxy) silane, dimethyldiethoxysilane, ethyltrimethoxysilane, vinyltris (2-methoxyethoxy)silane, phenyltris (2-methoxyethoxy)silane, vinyltrimethoxysilane and vinyltriethoxysilane and gamma-methacryloxypropyltrimethoxysilane.

In a particularly useful aspect of the invention, the bases resin is an ethylene-n-butyl acrylate copolymer comprising 45 to 50 weight percent of the total composition with 4 to 8 weight percent of a stabilizer package consisting of ZMTI and BDBDA, 10 to 15 weight percent ethylenebistetrabromophthalimide, 3 to 6 weight percent $Sb_2O_3$, 25 to 30 weight percent $Mg(OH)_2$ and 1 to 2 weight percent tertiary organic peroxide. Notably, wire constructions insulated with the improved compositions of the invention meet the requirements set forth in Underwriters Laboratories Inc., Subject 758 (Appliance Wiring Material Section General Guide) and significantly surpass the 158° C. oven aging requirements of Style 3321 for retention of 50 percent of the original elongation.

The present flame retardant compositions of the invention are therefore highly useful as insulating coatings for metal conductors—especially 1 to 30 AWG copper and aluminum, single or multi-strand wire or cable. The compositions are typically applied by extruding a substantially uniform 2 to 100 mil thick layer onto the metal conductor. More typically, insulation thicknesses will range from 10 to 60 mils. The compositions are especially useful to insulate wires for appliances, motor leads, etc., and have a superior balance of processability and physical properties and, when properly formulated, do not significantly discolor or tarnish the surface of the metal conductor. Furthermore, they are readily strippable from the conductor and leave a clean, shiny surface.

As previously pointed out, the compositions of the invention are readily processable and, after extrusion and cure, the resulting insulation meets the requirements for 150° C.-rated applications specified for 600V appliance wire in UL Style 3321.

The polymer compositions may also be used for other applications. For example, they can be extruded onto pipes and conduits for electrical and other applications. They can also be coextruded with one or more other thermoplastic materials to produce useful laminated constructions. Powders of these resins may be applied as coatings to either interior or exterior surfaces utilizing conventional powder coating procedures.

The following specific examples are provided to illustrate the flame retardant compositions of the invention and the manner in which the invention may be carried out. The examples are not intended to limit the invention and numerous variations within the scope of the invention will be apparent to those skilled in the art. In the examples, all parts and percentages are on a weight basis unless otherwise indicated.

EXAMPLE 1

To demonstrate the superior heat stability of the crosslinkable, flame retardant compositions of the invention upon aging at elevated temperatures, the following formulation was prepared and evaluated in an accelerated heat aging test.

| | |
|---|---|
| Ethylene-n-butyl acrylate copolymer[1] | 49.3% |
| Stabilizer[2] | 4% |
| Ethylenebistetrabromophthalimide | 8% |
| Antimony trioxide | 2.4% |
| Magnesium hydroxide | 35% |
| (α,α'-bis(t-butylperoxy)diisopropylbenzene | 1.3% |

[1] 19% n-butyl acrylate; MI 0.3 g/10 min
[2] a mixture of ZMTI and BDBDA at a ratio of 1.5:1.

The formulation was prepared by combining all of the ingredients and blending in a 240 cc Brabender mixer at 105° C. A small amount (100 ppm) copper powder was also included in the composition as an oxidation promoter for the accelerated heat aging test. Test specimens were prepared in accordance with ASTM D638 and cured at 176° C., 5000 psi for 20 minutes. The dumbbell-shaped samples were then hung in a convection oven and heated at 180° C. Samples were examined daily and brittleness determined by flexing the sample five times and then bending the sample back on itself until the ends touched. After releasing the bent specimen, it was visually examined in the area of stress for the formation of cracks. Specimens were determined to have failed at the first appearance of any cracks. The values reported are the average obtained for three samples.

The formulation of the invention withstood 19 days before failure. Two samples, identically prepared except that in one formulation, the ZMTI was omitted (Comparative Sample 1A) and in the other formulation (Comparative Sample 1B) the BDBDA was omitted, were also tested. Comparative Sample 1A failed after only five days and Comparative Sample 1B failed after seven days. The improvement in stability obtained using the mixed stabilizer system, i.e., the combination of ZMTI and BDBDA, is nearly 60 percent greater than the additive results obtained for the two comparative formulations.

To further illustrate the unobviousness of the improved heat aging results, a third comparative composition (Comparative Sample 1C) was identically prepared except that a hindered phenol was combined with the ZMTI at a weight ratio of 1.5:1. The hindered phenol used was 2,2'-oxamido-bis-[ethyl 3-(3,5-di-t-butyl-4-hydroxyphenyl) propionate] a commercial antioxidant sold under the tradename NAUGARD XL-1. When evaluated in the accelerated heat aging test, Comparative Sample 1C only withstood 12 days testing before failure.

Whereas all of the above formulations, inventive and comparative, exhibited comparable flame retardance, only the composition of the invention utilizing aromatic secondary amine in combination with a zinc mercaptobenzimidazole for stabilization had the requisite thermal stability when subjected to the rigorous conditions of the accelerated heat aging test.

EXAMPLES 2 and 3

To demonstate the ability to vary the amount of the brominated flame retardant and hydrated inorganic filler, two formulations were prepared in accordance with the following recipes. Except for the addition of a silane coupling agent, all the ingredients used were the same as employed for Example 1.

| | Example 2 | Example 3 |
|---|---|---|
| Ethylene-n-butyl acrylate copolymer | 51.6 | 47.7 |
| Stabilizer | 4 | 4 |
| Ethylene bistetrabromophthalimide | 2 | 5 |
| Antimony Trioxide | 0.6 | 1.5 |
| Magnesium hydroxide | 40 | 40 |
| Vinyltrimethoxysilane | 0.5 | 0.5 |
| α,α'-bis(t-butylperoxy)diisopropyl benzene | 1.3 | 1.3 |

Results of the accelerated heat aging test performed on both of these products were favorable. The formulation of Example 2 ran for 16 days before failure and the product of Example 3 withstood 18 days aging before onset of brittleness and failure.

EXAMPLES 4 and 5

Flame retardant insulation compositions were prepared identical to the recipes of Examples 2 and 3 except that a different brominated aromatic flame retardant was used. For these products the ethylene bistetrabromophthalimide was replaced with SAYTEX 8010, a proprietary non-diphenyl oxide based flame retardant compound containing a high level of aromatic bromine manufactured by Albermarle Corporation. Upon accelerated heat aging, these formulations ran for 16 and 17 days, respectively, before failure.

EXAMPLE 6

A flame retardant insulation compositions similar to that of Example 1 was prepared and evaluated for heat stability. The formulation was as follows:

| | |
|---|---|
| Ethylene-n-butyl acrylate copolymer[1] | 47.3 |
| Stabilizer[2] | 6.2 |
| Ethylene bistetrabromophthalimide | 12.5 |
| Antimony Trioxide | 4.5 |
| Magnesium hydroxide | 27.0 |
| α,α'-bis(t-butylperoxy)diisopropyl benzene | 1.5 |
| crosslinking coagent[3] | 1.0 |

[1]20% n-butyl acrylate; MI 6 g/10 min
[2]a mixture of ZMTI and BDBDA at a ratio of 4.2:1
[3]trimethylolpropane trimethacrylate Heat aging was conducted at 180° C. as in Example 1; however, for this test physical properties (tensile and elongation) were determined on the aged specimens in accordance with ASTM D638. For the purpose of comparison and to demonstrate the selectivity of the mixed stabilizer of the invention for ethylene-alkyl acrylate copolymers, a formulation (identified as Comparative 6A) was also prepared. The comparative composition was identical in all respects to the above recipe except that an ethylene-vinyl acetate copolymer (19% vinyl acetate; MI 2.5 g/10 min) was substituted for the EnBA copolymer.

Test results obtained for the inventive and comparative insulation compositions are tabulated below for the tensile strength (psi), elongation (%) and percent retention of original elongation. Values for the comparative composition are in parenthesis.

| | Tensile | Elongation | Percent Elongation Retained |
|---|---|---|---|
| Original (0 days) | 1730/(2313) | 343/(353) | 100/(100) |
| 7 days | 1879/(2627) | 247/(280) | 72/(79) |
| 14 days | 2051/(2513) | 233/(230) | 68/(65) |
| 21 days | 2107/(2599) | 227/(172) | 66/(49) |
| 28 days | 2095/(2212) | 213/(63) | 62/(18) |
| 35 days | 2236/(1606) | 155/(25) | 45/(7) |

The ability of the zinc mercaptobenzimidazole/aromatic secondary amine combinations to provide enhanced high temperature stabilization for the formulations of the invention which use an ethylene-alkyl acrylate copolymer as the base resin is apparent from the above data. While it was possible to retain greater than 50 percent of the original elongation for over 28 days with the composition of the invention, the same stabilizer used with a structurally similar ethylene-ester copolymer widely used in wire and cable formulations bad more than 50 percent loss in elongation before 21 days.

EXAMPLE 7

An identical formulation to that of Example 6 was prepared except that the copper powder was omitted. Mixing was carried out by combining all of the ingredients in a Banbury mixer and mixing at 120° C. for 4 minutes. The resulting homogeneous blend having a density of 1.3 g/cm³ was evaluated for electrical properties in accordance with ASTM D150. The compound had a dielectric constant of 3.48 and dissipation factor of 0.004, both determined at 60 Hz. The composition was extruded onto 20 AWG tinned copper wire at a wall thickness of 30 mil using a single screw extruder (L/D 20 to 1; 14 rpm; heating zones at 225–235° C.; head temperature 240° C.). The line speed was 400 ft/min. Vulcanization was accomplished by passing the insulated wire through a steam tube maintained at 260 psi. The crosslinked insulated wire was then evaluated by methods described for UL Subject 758, Style 3321 and met all of the test criteria. The insulated wire passed the horizontal flame test and no cracks were observed in the cold bend (1 hour at −10° C.) and flexibility (150 days at 158° C.) tests. There was no conductor corrosion after oven aging. Percent retention of tensile strength and elongation after testing 7 days at 180° C. was 122 percent and 80 percent, respectively. Even after testing 150 days at 158° C., 72 percent retention of the elongation was achieved.

Oven aging results at 158° C. (UL 1581, Style 3321) obtained with 20 AWG tin coated solid copper conductor insulated (30 mil wall thickness) with the above formulation were as follows:

| | Tensile (psi) | Elongation (%) | Percent Elongation (Retained) |
|---|---|---|---|
| Original (0 days) | 1554 | 323 | 100 |
| 30 days | 2017 | 257 | 80 |
| 60 days | 2142 | 247 | 76 |
| 90 days | 2441 | 225 | 70 |
| 120 days | 2582 | 248 | 77 |
| 150 days | 2454 | 232 | 72 |

I claim:
1. A crosslinkable, flame retardant composition useful for high temperature service wire and cable insulation consisting essentially of:
   (1) 30 to 65 weight percent of a base resin consisting of an ethylene-n-butyl acrylate copolymer, said copolymer containing 10 to 30 weight percent n-butyl acrylate and having a melt index of 0.3 to 10 g/10 min;
   (2) 1 to 10 weight percent of a stabilizer consisting of a mixture of a zinc salt of a mercaptoboenzimidazole selected from the group consisting of zinc 2-mercaptobenzimidazole and zinc 2-mercaptotolylimidazole, with 4,4'-bis (α,α-dimethylbenzyl)diphenylamine, the weight ratio of zinc salt to amine ranging from 0.5:1 to 10:1;
   (3) 5 to 40 weight percent ethylene bistetrabromophthalimide;
   (4) 1.5 to 20 weight percent antimony trioxide;
   (5) 5 to 50 weight percent magnesium hydroxide; and
   (6) 0.1 to 4 weight percent tertiary organic peroxide selected from the group consisting of dicumyl peroxide and α,α-bis(t-butylperoxy)diisopropylbenzene.
2. The composition of claim 1 which additionally contains a crosslinking coagent selected from the group consisting of triallylcyanurate and trimethylolpropane trimethacrylate.
3. The composition of claim 1 which additionally contains an alkoxysilane binding agent having 2 or 3 $C_{1-3}$ alkoxy substituents.
4. The composition of claim 1 containing 42 to 52 weight percent base resin, 2.5 to 9 weight percent stabilizer, 10 to 15 weight percent ethylene bistetrabromophthalimide, 3 to 6 weight percent antimony trioxide, 20 to 35 weight percent magnesium hydroxide and 1 to 2 weight percent tertiary organic peroxide.

5. The composition of claim 4 wherein the zinc salt of the mercaptobenzimidazole is zinc 2-mercaptotolylimidazole and the ratio of zinc. 2-mercaptotolylimidazole to 4,4'-bis (α,α-dimethylbenzyl)diphenyl amine is 1:1 to 6:1.

* * * * *